June 22, 1937.  G. H. CHARNOCK  2,084,319
SURFACE MARKING APPARATUS
Filed Dec. 19, 1934  6 Sheets-Sheet 1
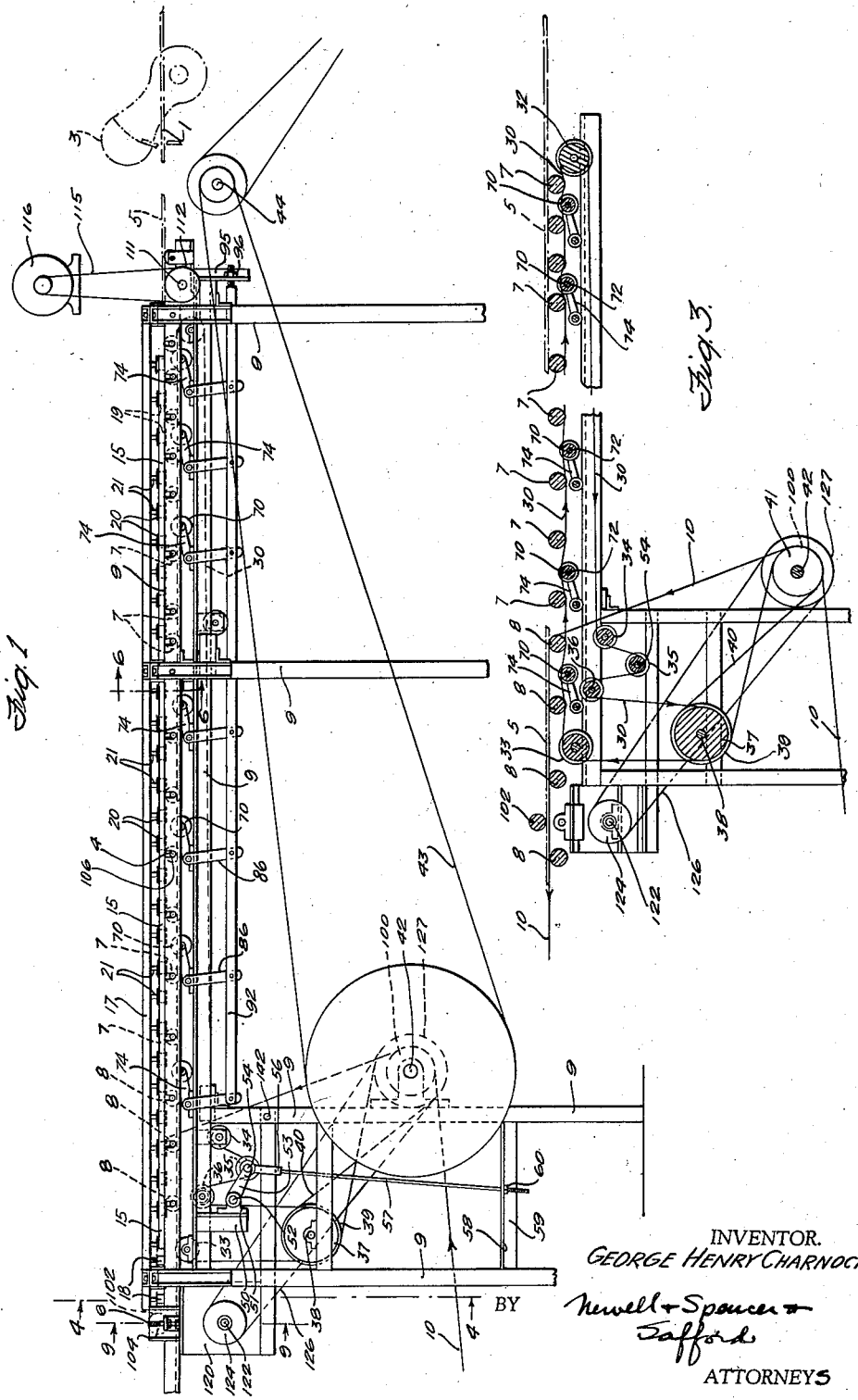
INVENTOR.
GEORGE HENRY CHARNOCK
BY
Newell + Spencer
Safford
ATTORNEYS

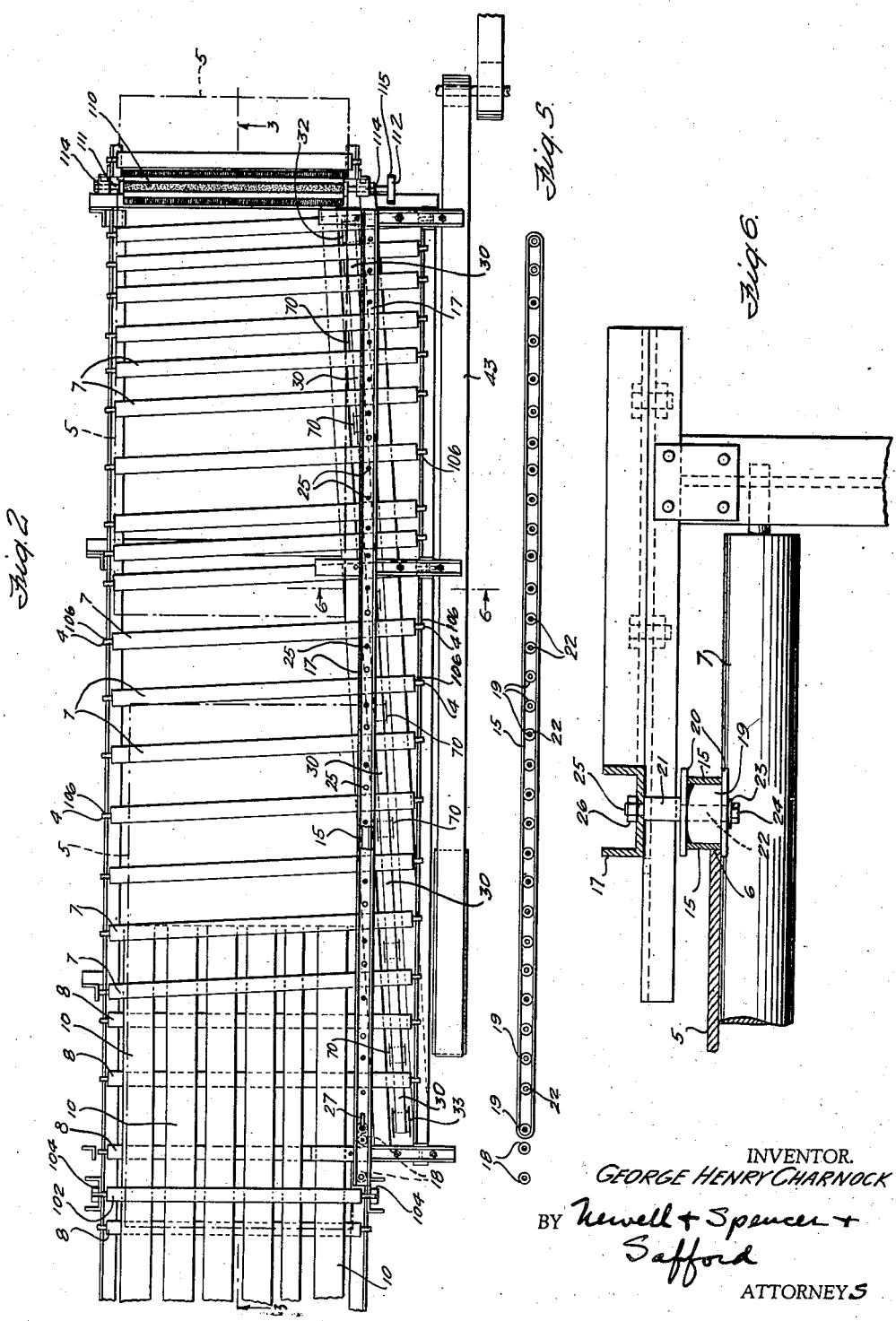

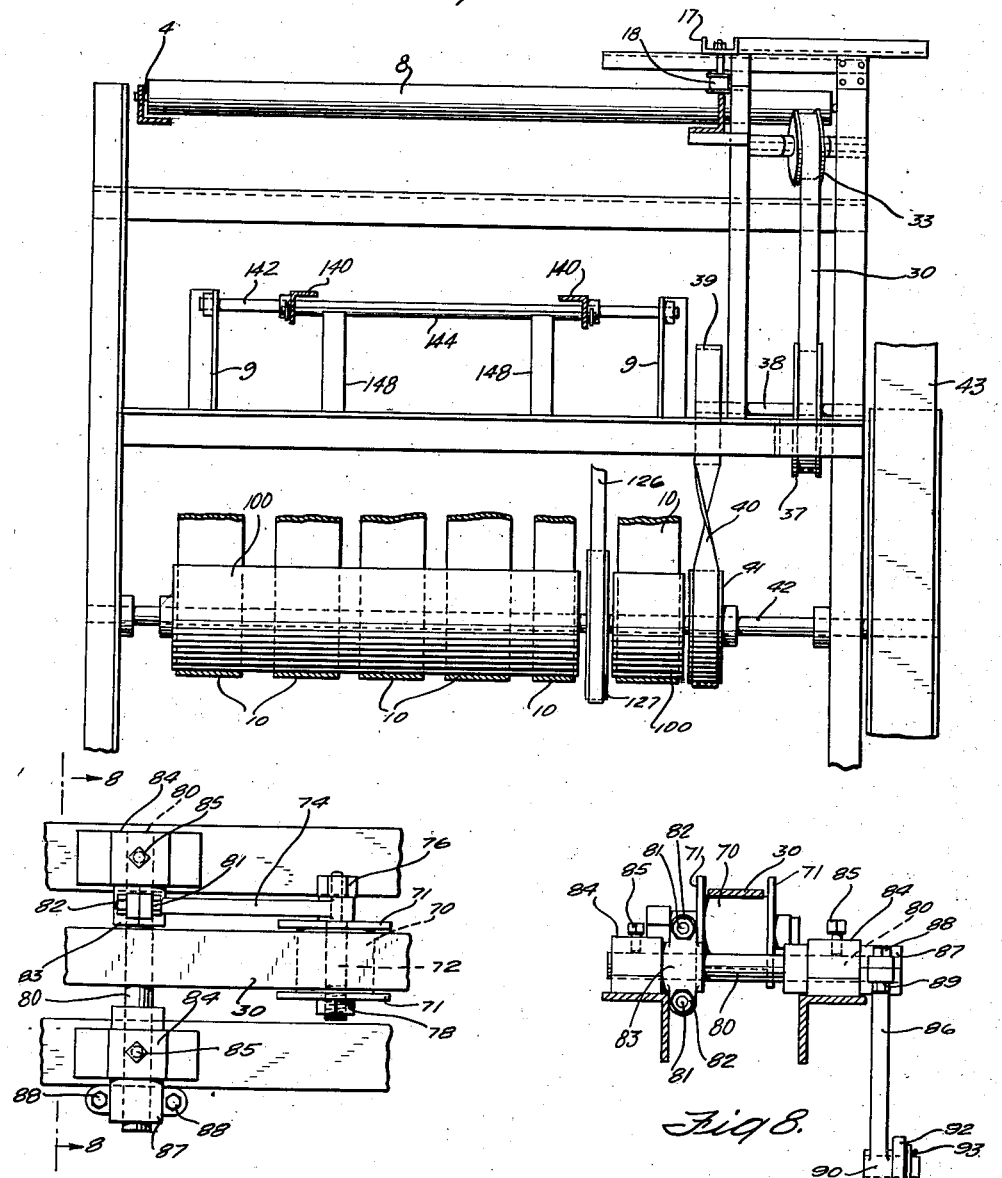

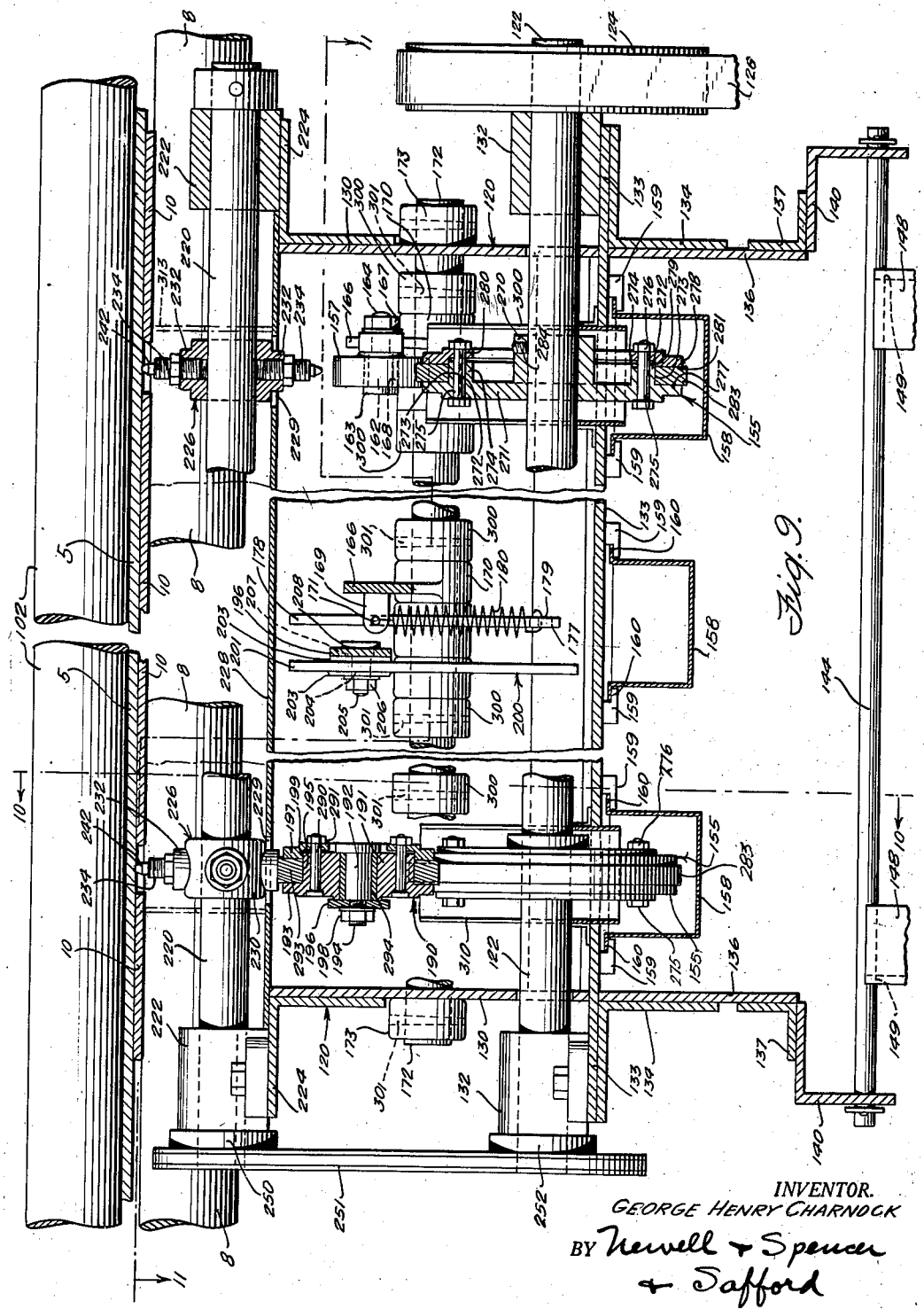

June 22, 1937.  G. H. CHARNOCK  2,084,319
SURFACE MARKING APPARATUS
Filed Dec. 19, 1934   6 Sheets-Sheet 5

INVENTOR.
GEORGE HENRY CHARNOCK
BY Newell + Spencer
Safford
ATTORNEYS

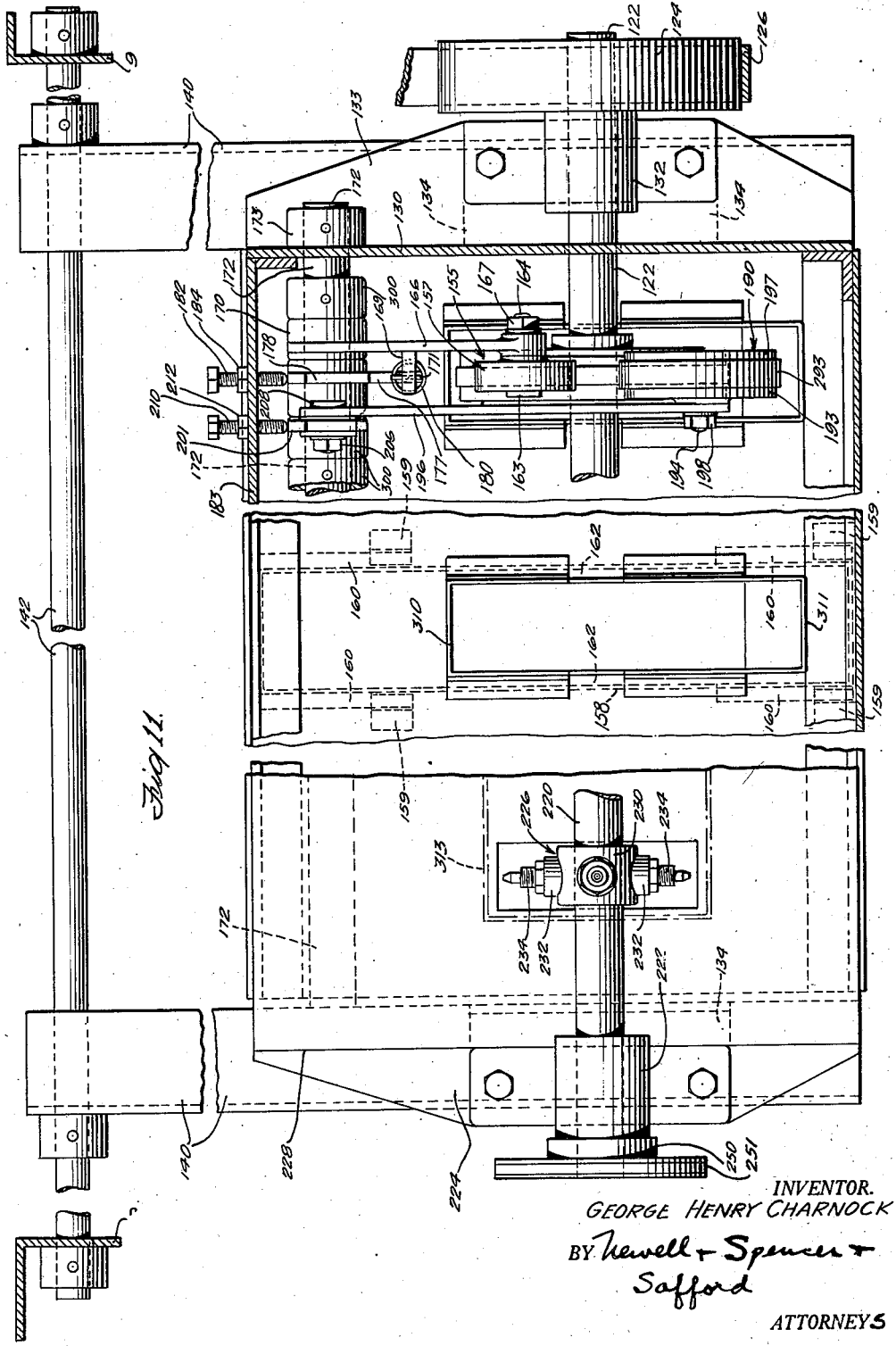

Patented June 22, 1937

2,084,319

UNITED STATES PATENT OFFICE 2,084,319

SURFACE MARKING APPARATUS

George Henry Charnock, Buffalo, N. Y., assignor to Certain-Teed Products Corporation, New York, N. Y., a corporation of Maryland Application December 19, 1934, Serial No. 758,165

37 Claims. (Cl. 101—35)

This invention relates to methods of and apparatus for marking the surface of sheet material and more especially for printing upon the surface of a sheet marks in defined relation to said surface. The invention particularly relates to printing or otherwise impressing upon the surface of panels of covering material marks in position to indicate points of fastening of the panels upon a supporting structure.

The printing of the surface of a sheet, for example a sheet of paper with defined points of the printed area or of the printed form or design in predetermined relations to the lengthwise and transverse edges of a sheet, has been accomplished in many ways including the method of passing the sheet in circumferential contact with a rotating printing device, said sheet being guided and fed so that the printed area and particular points thereof are in predetermined relation to the edges of the sheet. The guiding of the sheet has been accomplished by feeding the sheet with one edge thereof in contact with a fixed guide means.

The present invention is concerned with a particular method, and apparatus for carrying out this method, of feeding a sheet or a series of sheets into contact with a marking or printing device so as to print or impress a mark upon the surface of the sheet in a predetermined relation to the lateral edge of the sheet. The invention is also concerned with the feeding of the sheet in a predetermined relation to the motion of the rotating device so as to print or mark upon the sheet in a predetermined relation thereto lengthwise of the feeding motion.

The invention has particular application to the marking of panels of covering material, such as wall board, whether made of fibrous materials or of plaster, such as plaster board made of calcined gypsum and usually covered with a covering of paper. The invention is applicable to sheets of material whether of definite or indefinite length and is particularly useful in connection with panels of wall board or other covering material which have a certain degree of stiffness although not necessarily rigid, and preferably have a thickness sufficient to provide a substantial bearing of the edge of the panel against a guiding means. Wall boards manufactured from cellulose fiber and plaster boards of calcined gypsum with a paper casing usually are somewhat flexible but are sufficiently stiff to be moved bodily in the plane of the board without excessive bending or crumpling thereof and may have their edges pressed against a resisting surface without such deformation.

The invention will be described in connection with an important application thereof in the manufacture and use of such wall board materials although the invention is not limited to such materials and the method of applying marks thereto may be utilized on sheet materials of various kinds and of various degrees of stiffness and of thickness.

Wall board materials whether of fiber or of plaster usually are of such size as to cover a plurality of studs or other supports or points of fastening the wall board upon the structure. In common practice wall boards having a width of 32", 36" and 48" and a length of from 6 to 12 feet have been used. Difficulty has been experienced in fastening boards of this size in both dimensions, or even in only one dimension, because it is impossible to see where to drive the nails into the studding or otherwise insert fasteners to contact or meet the desired point of fastening beneath the panel. Heretofore it has been proposed by others to mark upon the surface of such a panel a line or a series of dots in a predetermined relation to the edges of the panel so as to provide marked points for fastening the panel upon the intermediate studs or supports. The present invention in its more particular embodiment and application is concerned with the method of and the apparatus for making such marks upon the surface of sheets or of wall panels in a predetermined relation to the lateral edges thereof and in a certain more or less defined but nevertheless predetermined relation to the dimension in the direction generally parallel to the lateral edges.

According to my invention I so move such a sheet or panel generally substantially in the plane thereof and, in the case of sheets of regular shape or of predetermined dimension, in a direction generally parallel to the one edge thereof, which edge, for the purposes of the present description, may be defined as a lateral edge. I so effect this motion as to move the sheet or panel toward and into contact with a printing or marking device which will print or make a mark upon the surface or face of the sheet or panel. In addition to this forward or feeding motion of the panel, and preferably simultaneously therewith, I also effect a motion of the panel substantially in the plane thereof laterally of said forward motion and in the direction outwardly of the panel from a lateral edge thereof. This lateral motion of the panel is so effected as to move the panel into a position from which it may move forward in predetermined alignment with the marking or printing device. I may so effect this movement as to bring the edge of the panel against a guide, which guide is so positioned and so arranged that, upon forward movement of the panel generally parallel to the lateral edge thereof, said panel is guided into contact with the printing or marking device and the mark is printed or made upon the face of the panel in a predetermined relation to the lateral edge thereof. Preferably the lateral movement of the panel is effected during the first part of the forward motion of the panel toward the printing device and is arrested upon contact with said guiding means, that is, when the panel, preferably without interrupting its forward motion, has come into the desired alignment with the marking device.

Especially in the manufacture of wall boards, and more particularly in the manufacture of plaster board by the method in which a continuous sheet of plaster board is delivered and the panels are cut off successively from the delivered end of the sheet, the delivered position of the panels in a direction laterally of the lateral edges thereof may vary with the successive or different panels. The sheet of material as it passes through the wall board or plaster board machine "weaves" laterally of the length of the sheet and if provision were not made for securing proper alignment of the panels with the marking device the desired predetermined relation of the mark on the face of the panel to the lateral edge thereof would not be secured. In order that this desired alignment shall be obtained according to my invention I move each of the panels after being cut off from the delivery end of the sheet laterally of its lateral edge in excess of the "weave" which is experienced with the particular apparatus and type of product being manufactured. Thus I am not only able to move the panel into the desired line of motion thereof as it moves forward toward the marking device, but I am also able to effect the necessary lateral motion entirely in one lateral direction. I thus avoid the necessity of moving the panel sometimes in one lateral direction in order to maintain the alignment and at other times in the opposite lateral direction to offset the "weave" of the sheet in the different directions with respect to an average position.

By thus moving the panel in excess of the "weave" of the sheet I am able to adapt particular means hereafter to be described for effecting a continuous forward motion of the panel and a simultaneous lateral motion thereof. The means for producing these motions may be arranged so as to bias the sheet or panel to move laterally and to cooperate with the guiding means, and particularly that form of it to be described hereafter, to secure the desired motion in predetermined alignment with the marking device while controlling the motion of the panel both laterally of its lateral edges and in the forward direction. I also am able positively to move the panel in its lateral and forward motion and may combine with this positive motion a positive and predetermined relation of the movement of the marking device in order to secure predetermined positions of the mark or marks upon the surface in the direction of the length of the panel. This feature of the invention is particularly adapted to the printing upon the face of a wall board panel of a series of marks at substantially predetermined intervals and substantially in a predetermined relation to the transverse edges of the panel as well as in the desired alignment having a predetermined relation laterally of the lateral edges of the panel.

The invention also contemplates certain mechanisms for accomplishing the printing or marking of the face of the panel, especially devices for printing a series of marks at predetermined intervals and in alignment in a line in a predetermined lateral relation to the lateral edges of the panel. Panels with such marks have particular adaptation as wall covering panels for fastening upon studs in a framed structure, especially structures framed with studs of wood or other material into which nails may be driven. It is desirable in such marked or printed panels that, not only shall alignment of the spaced marks be secured and that it shall be sufficiently accurate so that the nails will enter the studs, but that the spacing of the marks lengthwise of the line, that is, lengthwise of the stud, shall be without great variation. This accuracy is desirable so that a predetermined spacing of the nails in the studs may be secured by driving the nails either at every mark, if such close spacing is necessary, or at every second or third or other selected interval determined by the marks. It is thus desirable and my invention accomplishes substantially a uniform spacing of the marks and with a panel of predetermined length thus may accomplish a substantially predetermined relation of the line of spaced marks as a whole upon the panel in the direction lengthwise thereof. In order to accomplish these defined relations of the marks upon the panel according to my invention I positively drive the printing device in a predetermined relation to the means for positively moving the sheet in the forward direction.

By positive movement of the panel as referred to above I mean a movement effected by positively acting means but this means may be of such construction and may be so arranged in relation to the panel and may have the driving power so applied thereto that some slippage or lost motion may occur in the mechanism or between its parts in order that the slippage of the parts of the mechanism in contact with the face or edge of the panel may be minimized or prevented. Such slippage or rubbing of the parts upon the face of the panel may mar the surface thereof.

The invention also contemplates particular devices for producing the desired motions of the panels and for guiding the panel, as broadly described above, and also contemplates particular mechanisms for effecting the printing of the series of marks upon the face of the panel. These mechanisms include devices for successively and at substantially uniform intervals applying or printing marks upon the face of the sheet, devices for controlling the pressure of such application and the amount of inking material applied to the printing member, means for readily bringing the printing device into operation or for taking it out of operation, for preparing the surfaces of the sheet for the printing, for renewing the ink supply while maintaining operation of the printing device and other means hereafter to be described. The invention may be applied to existing wall board and plaster board apparatus so as to carry out the process in continuity with the regular wall board or plaster board manufacturing operation.

The invention contemplates positive movement of the panel in the forward and lateral directions, as above described, but under such control that a substantially uniform forward motion of the panel is effected in the position of alignment with the marking device. Moreover, especially with panels of sufficient stiffness such as is possessed by wall panels of fiber or of plaster, this positive motion or drive of the panel may be utilized to move a movable guiding means or a part thereof which is movable in the forward direction. The particular arrangement of such means will be hereafter described but by this means the friction which the positively driven wall board must overcome is materially reduced or eliminated and thus the alignment is maintained and uniform forward motion of the panel is secured. In order to secure the positive motion of the means for moving the panel I provide devices for securing a substantially uniform application of the power necessary to drive the panel.

The invention contemplates various adjustments of the devices utilized and of the structure for supporting these devices which make possible the printing or marking of sheets or panels of various widths and with the marks or with the line of marks in different though predetermined relations to the lateral edges of the panel.

The invention will be more particularly described in connection with the drawings in which Figure 1 shows a longitudinal elevation of a portion of a wall board machine embodying the features of the invention;

Figure 2 is a plan view of the portion of the machine shown in Figure 1;

Figure 3 is a section on line 3—3 of Figure 2;

Figure 4 is a section on line 4—4 of Figure 1;

Figure 5 is a plan view of the guiding means;

Figure 6 is an enlarged cross section on line 6—6 of Figures 1 and 2;

Figure 7 is a portion, in enlarged scale, of the plan view of Figure 2;

Figure 8 is a section on line 8—8 of Figure 7;

Figure 9 shows the section of the printing device on line 9—9 of Figure 1;

Figure 11 shows a section on line 11—11 of Figure 9;

Figure 10:
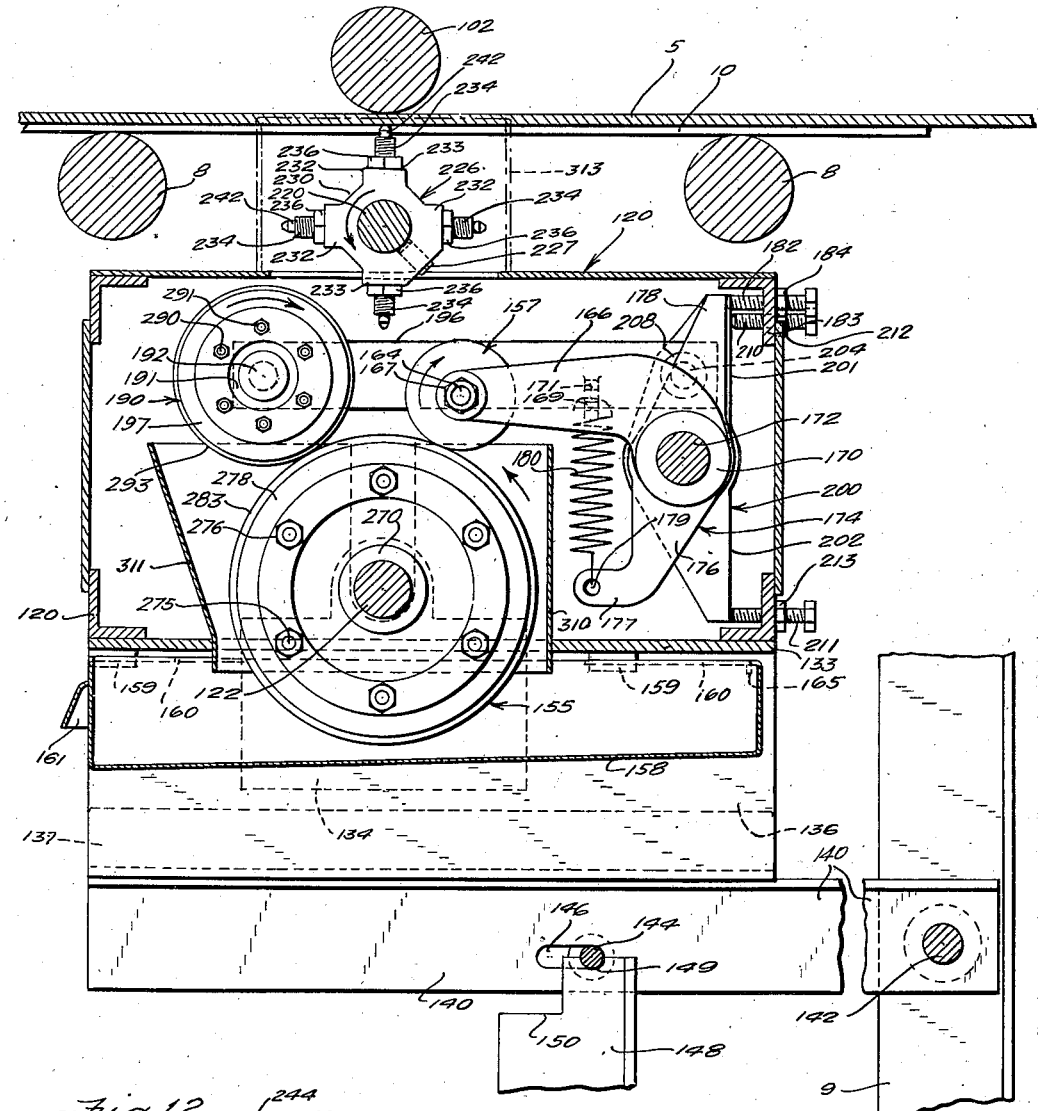
Figure 10 shows a section on line 10—10 of Figure 9.

In the particular embodiment of the invention illustrated in the drawings in Figures 1 to 8 the portion of a plaster board machine over which the plaster boards pass, after being cut off from the continuous sheet 1 delivered from the fabricating portion of the machine, has been modified to include the devices which are features of the present invention and which effect the carrying out of the process of the invention. In Figure 1 the knife 3 shown at the right hand of the figure is part of the regular plaster board machine and, by devices which are not part of the present invention, is controlled successively to cut off panels 5 of substantially uniform length from the end of the plaster board sheet 1 as it passes under the knife 3. These panels in the normal plaster board machine are carried over a set of rollers similar to the rollers 7 illustrated in Figures 1, 2 and 3 on their way toward the drying apparatus. This portion of the machine has a framework generally designated by the numeral 9 which supports the rollers 7 with their circumferences substantially tangent to the line of delivery of the under face of the panel 5. These rollers, in the normal apparatus, are spaced on such centers and are of such diameter as properly to support the board as it moves forward from the knife 3.

In the apparatus of the present invention these rollers also are spaced on such centers and as well are made of such diameter that not only is the proper support given to the board but sufficient contact with the board is provided so that, when said rollers 7 are positively driven by means hereafter to be described, a positive driving contact with the board is secured in order that it may be positively moved forward and so that its motion and its rate of motion are positively controlled. Thus, the board may be moved in relation to the printing device, hereafter to be described, in a positive manner and so that the marks to be printed thereon may be printed in a defined relation lengthwise of the panel. Particularly when marks such as dots are to be printed in a line lengthwise of the panel, a substantially uniform spacing of the dots may be secured by properly correlating the motion of the printing device in relation to said substantially uniformly moving panel of the plaster board.

As shown in Figure 2 the rollers 7, which in the normal machine are set with their axes at right angles to the line of motion of the panel, in the apparatus of the invention are set with their axes at an angle other than a right angle to the line of motion or of feed of the panel. Thus, the circumferential delivery of the rollers 7 is at an angle to the general forward line of motion of the panel and by this means the panels, in addition to their forward motion, are given a motion toward one side of the apparatus. It will be noted from Figure 2 that sufficient rollers in the "skewed" position are provided between the knife 3 and the portion of the machine toward which the panel is to be delivered so that, as the panel passes over said rollers 7, it may be moved a substantial distance laterally of the forward motion of the panel.

In the particular apparatus illustrated in Figure 2, seventeen of these rollers are provided in order to provide sufficient support for the board during its forward and its concomitant lateral motion into the desired position in alignment with the printing devce. In feeding a panel, for example, of substantially 9-foot length the distance between the rollers 7 may average approximately 12 inches in order that the total space occupied by these rollers 7 shall be about 16 feet. Thus, in moving a panel of 9 foot length through the distance of about 4 to 6 feet sufficient opportunity is given to move the panel laterally of its forward motion a distance, for example, of 1 to 3 inches. In order to accomplish a lateral motion of the panel of this amount the rollers 7 thus may be set at such an angle that in each foot of length of the roller one end of said foot of length is forwardly positioned with respect to the other end of said foot of length a distance of, for example, ¼ inch to ½ inch. These relations may be varied to suit different conditions and different kinds of panels as to the weight of the panel and the type of surface of the sheet.

The amount of lateral motion which it is desirable shall be given to the sheet is determined in part by the amount of weave of the sheet 1 as it is delivered from the fabricating portion of the plaster board machine. The selected amount of the lateral movement of the panel 5 preferably is such as to exceed the extreme amount of weave or other variation of the sheet 1. This selected amount of lateral movement determines the position of the guiding means 15 which includes the supporting channel member 17 extending parallel to the forward line of motion of the panel. As illustrated in Figures 5 and 6 the face of the guiding means 15, which in the particular embodiment illustrated is in the form of a flexible belt or band 19 passing over rolls 19 having flanges 20 thereon for the purpose of guiding the belt, extends parallel to the forward line of motion of the panel, that is, to the longitudinal dimension of the apparatus. Thus, the panel 5 having its lateral edge 6 bearing against the face of the belt 15 may be held in proper alignment for the forward motion into contact with the printing device. The above described lateral movement of the panel produced by the "skewing" of the rollers 7, these rollers preferably being arranged in parallel relation to each other in the skewed position, may be so effected that substantially the edge 6 of the panel is maintained parallel to the forward line of movement or the longitudinal line of the apparatus until the edge 6 of said panel contacts with the face of the belt or band 15. In some cases, however, it may be desirable to move one end of the panel more or less rapidly toward the guiding means than the other. This may be accomplished by suitable angular setting of the skewed rollers in relation to each other. The length of the belt or band 15 preferably is such as to extend beyond the space occupied by the "skewed" rollers so that, as the panel is moved forward, guiding thereof is continued until the panel is in contact with the printing device and is under the control of the positively driven rollers 8 and of the belts 10 passing thereover.

In the particular apparatus illustrated in the drawings the belt or band 15 is arranged as an endless band passing over the rolls 19, which are positioned in general alignment parallel to the line of motion of the panel, each of said rolls being mounted on a vertical stud 21 and being held upon the shank 22 of said stud in free running relation thereto by a washer 23 and a nut 24, as illustrated in Figure 6. In order that the circumferences of the rolls 19 all may be tangent to a common straight line parallel to the longitudinal dimension of the apparatus, that is, the line of forward motion of the panel, the shank 22 is formed eccentric to the portion 25 of the stud 21, which is fastened to the channel member 17 by the nut 26. Thus the stud 21 may be rotated in the hole in the member 17 through which the shouldered portion 25 passes in order to move the shank 22 into different positions laterally of the general alignment of the studs 21. It will be clear that this means of effecting alignment of the circumferences of the rolls 19 also is effective for aligning the face of the belt or band 15 so that as the panel 5 is moved thereagainst a substantially complete and uniform bearing of the edge 6 of the panel against the band 15 is secured.

In the particular embodiment illustrated no means is provided for positively driving the rolls 19. Under the impulse and forward movement given to the panel 5 by the rollers 7 and in view of the firm and uniform contact with the belt 15 secured by the arrangement above described and also in view of the design of the rolls 19 and of the studs on which they are mounted so that easy turning movement of the rolls 19 is secured, the belt 15 may move forward with the panel 5 without substantial slippage occurring between the edge 6 of the panel 5 and said belt 15. Thus is secured a uniform forward movement of the panel and a uniform guiding of the panel into contact with the printing device.

As has been above mentioned, the rollers 7 are given a positive driving rotation and this is accomplished by the means illustrated in Figures 2, 3 and 4. In Figure 3 is shown an endless belt 30 in contact with the lower circumferential portions of the rollers 7. This belt passes over a flanged pulley 32 positioned at the end of the apparatus which is adjacent the cutter 3. The belt 30 then passes over sheaves 34, 35 and 36, which are utilized to maintain a substantial tension in the belt by means hereafter to be described. The belt 30 then extends to and over the flanged pulley 37 from which it passes over the flanged pulley 33 and then into contact with the rollers 7 as above mentioned. In order to effect the positive drive of the band 30 power is transmitted as shown in Figures 1, 3 and 4 to the flange pulley 37 by a shaft 38 upon which the flange pulley 37 is mounted, upon which shaft also is fastened a pulley 39 driven by crossed belt 40 receiving its power from a pulley 41 mounted on the shaft 42, which, as a main drive shaft for this portion of the apparatus, receives its power through the belt 43 from a shaft 44 driven from the main fabricating portion of the apparatus. Thus, there is applied to the belt 30 a positive drive which, when proper contact is provided between the belt 30 and the rollers 7, causes the rollers 7 positively to move in a defined relation to each other and to the other driven portions of the machine, particularly the printing device, as will be described hereafter.

In order to accomplish a proper driving contact of the belt 30 with the rollers 7 the sheaves 34, 35 and 36 are so mounted that slack in the band or belt 30 may be taken up so that a proper driving tension may be secured in this belt. In order to effect such a take-up the sheaves 34 and 36 are mounted upon bearings which are fixed in relation to the frame 9 of the machine. Upon a bracket 50 depending from a horizontal angle of the frame 9 of the machine is mounted a journal 51 carrying a stud 52 upon which is pivoted or swings the arm 53 as shown in Figure 1. Upon a suitable pin 54 fastened in the arm 53 at its outer end is mounted the sheave 35 in free turning relation to said pin. Connected also to the outer end of said arm 53 by a suitable connecting piece 56 is the connecting rod 57 which passes through the flange 58 of an angle member 59 of the frame 9. Bearing against the under side of the flange 58 is a nut 60 threaded upon the rod 59. By turning the nut 60 as it bears against the flange 58 the rod 57 may be pulled downward thus causing the sheave 35 to be drawn down and thus to take up the slack in the band 30. It will be apparent that in thus taking up the slack the band 30 is caused to contact with greater pressure against the under side of the rollers 7, the circumferences of the flange pulleys 32 and 33 being arranged in such alignment with each other and with the lower circumferential portions of the rollers 7 that the desired contact is effected.

For the purpose of causing the belt or band 30 to contact with the rollers 7 for a sufficient circumferential distance to secure a positive driving contact and pressure upon the rollers 7 by the band 30 I utilize sheaves 70 positioned between certain of the rollers 7 and contacting with the under side of the belt or band 30. As shown in Figures 3, 7 and 8, these sheaves 70 are provided with flanges 71 which serve to maintain the belt in proper alignment upon these sheaves. Sheaves 70 are supported in free running relation to a stud 72 having a shoulder and fastened in an arm 74 by means of a nut 76. The stud at its outer end is threaded and provided with a nut 78 which acts to maintain the sheaves 70 upon the stud 72. The arm 74 is formed at its inner end to bear upon a fixed shaft 80 to which, by means of bolts 81 and nuts 82 and the clamp piece 83, the arm 74 is firmly clamped. The shaft 80 is held in bearings 84 and in fixed relation to said bearings by means of set screws 85. Thus, by suitably positioning the arm 74 and then tightening the clamping nuts 82, said arm may be held in such position as to bring the sheaves 70 into contact with the belt 30 and in such position as to cause said belt 30 to contact with the rollers 7 throughout a substantial portion of the circumferential surface thereof. Adjustment of the arms 74 and of the degree of contact of the sheaves 70 with the belt 30 for the purpose just described, therefore, may be made to secure the desired degree of positive driving contact of the belt or band 30 with the rollers 7. The degree of tension in the belt 30 additionally may be controlled and adjusted, as described above, by means of the nut 60 and the rod 57 to move the sheave 35, after setting and adjustment of the sheaves 70 has been effected.

In Figures 7 and 8 is shown depending from the shaft 80 an arm 86 which may be clamped upon the shaft 80 by a clamping piece 87 and bolts 88 and nuts 89 similar to the clamping piece 83 and bolts 81 and nuts 82 of the arm 74. The lower end of the arm 86 is provided with a stud 90 fastened in the arm 86 by a set screw 91, said stud passing through a hole in a bar 92, which bar is retained upon the stud 90 by cotter pin 93 passing through the stud 90. As shown in Figure 1 the arms 86 of the several tension devices carrying the sheave 70 may be connected together by said bar 92, which bar, at its extreme end, may be formed to pass through a plate 95 at the end of the apparatus adjacent the knife 3. Said bar 92 conveniently may be so formed as to have the end thereof threaded for the nut 96, by means of which the bar 92 may be moved toward the right in order to rotate in the bearings 84 the shaft 80 to which the arms 86 and 74 are clamped, thus to press the sheaves 70 with greater force against the under side of the belt 30. When this arrangement is used the set screws 85, by means of which the shaft 80 may be held in fixed position as above described, are removed so that the shaft 80 is free to turn in the bearings 84. Thus may be provided a means for simultaneously adjusting the position of all the sheaves 70 to secure the desired degree of contact of the belt 30 with the rollers 7. The tension of the belt 30 may be controlled by means of the nut 60 and rod 57, as described above. As has been suggested above the degree of tension produced by the adjustments described may be so limited or controlled that, while providing substantially positive driving contact of the belt or band 30 with the roller 7, there also is secured the possibility of slight slippage of the band 30 in contact with the roller 7 or between other parts of the driving mechanism so as to prevent such an amount of slippage of the roller 7 upon the face of the panel 5 as would cause marring of said face.

It will be noted in the plan view of Figure 2 that the belt 30 is placed at an angle to the longitudinal line of the apparatus. This is done in order that the belt 30 shall run squarely on the rollers 7, as preferably the line of this belt is at right angles to the axis of the rollers in order that these rollers shall be given full driving contact with the belt. In order that this belt may be run at said angle to the longitudinal line of the machine the pulley 33 also may be set at an angle as shown in Figures 2 and 4. A slight twist may be given to the portion of the belt extending vertically from the pulley 37 to the flange pulley 33, thus obviating the necessity of also skewing the shaft 38 from which the flange pulley 37 receives its power, this shaft transmitting the power from the fabricating end of the machine as above described.

In Figure 3, some of the rollers 8, which are positioned square with the line of the delivery of the board, also are shown contacted by the belt 30. A flanged sheave 70, carried by an arm 74, may be arranged as described above in relation to the rollers 8. Thus positive motion may also be given to the rollers 8 which are contacted by said belt 30. The two rollers 8 of the particular arrangement illustrated which are so contacted, however, are part of a series of rollers 8, as shown in Figures 2 and 3 in contact with which pass the belts 10. This set of belts is supported by the rollers 8 and acts to move the board past the printing device and to deliver the board, after the printing operation, to the portion of the machine which carries out the subsequent operation. The belts 10 pass toward the left to a set of pulleys not shown, from which they return under the machine to the pulleys 100 mounted on the shaft 42 and then pass again to the rollers 8. As the shaft 42 is positively driven, as above described, the belts 10 are positively driven, which belts, in contacting the rollers 8, positively turn these rollers upon their axes. It will be understood, however, in the apparatus being described, that the board as it is being printed and also subsequent to the printing operation is carried on and borne by the belts 10 supported by the rollers 8. The size of the pulleys 100 is so selected in relation to the speed of the shaft 42 that the speed of the belts 10 may be substantially the same as the circumferential speed of the rollers 7 in order that the rate of forward movement of the panel 5 shall be continued uniformly as it passes from the control of the rollers 7 into the zone where it rests upon the belts 10.

While, as described above, driving movement may be given from the belt 30 to some or all of the rollers 8, this driving movement in all cases is not necessary and the rollers 8 may be driven entirely by the belts 10. When the speeds of the belts 10, however, and of the belt 30 are properly secured, uniform speed of the panel forward under the guidance of the belt 15 may be effected so as to secure the alignment of the panel with the printing device and its continuous uniform movement in relation thereto. In some cases, in order to hold the panel down upon the belts 10 as it is being printed, a roller 102 mounted in bearing brackets 104 may be so positioned that the panel must pass thereunder and in contact therewith so that the printing device, acting from below the belts 10, substantially may act against a counter surface.

Although in Figure 3 the belts 10 are shown passing over the four rollers 8 as these belts move from the pulleys 100, in some cases these belts may pass from the pulleys 100, for example to only the two left hand rollers 8 of the Figure 3. The drive of the two right hand rollers, 8 then would be affected by the belt 30, as described above. In some cases, however, greater or less overlapping of the zone of action of the belts 10 and the belt 30 may be utilized.

In order that the rollers 7 and 8 shall perform their functions of supporting the panel, of supporting the belts 10 and 30 passing thereover or in contact therewith and of transmitting the motion received from these belts, it is desirable that they shall turn easily on their axes while being firmly positioned with respect to the supporting framework 9. For this purpose in one form of the apparatus for carrying out the invention I utilize rollers having a shaft or rod 4 passing axially therethrough upon which shaft or rod 4 is mounted a roller bearing of common type having the outer race thereof fitted to the inner circumference of a hollow cylinder forming the roller, the inner race of the roller bearing being fitted upon said shaft or rod 4. One of such roller bearings preferably is fitted at each end of the hollow roller. By utilizing such a construction for the rollers I may easily position the rollers in the angular relation to the longitudinal line of the apparatus by merely setting the ends of said shafts or rods 4 in suitably positioned notches 106 in the horizontal longitudinal angle iron members of the frame 9, as shown in Figures 1 and 2. If desired, I may cut additional notches 106 in said angle iron members in order to utilize different angular settings in different cases.

While the belt or band 15 has been described above as providing the surface of the guiding means against which the edge 6 of the panel 5 bears and together with which it moves, in some cases I may omit the band 15 and rely on the numerous contacts provided by the circumferences of the rolls 19 to effect the proper guiding of the panel. As these rolls 19 are free to turn upon the shank 22 of the stud 21 the contact of the edge 6 of the board therewith may cause these rolls to turn on said shank, thus to effect the guiding of the sheet without substantial resistance and with an effective continuous contact of the edge with the guiding means. It will be noted at the left hand of Figure 5 that rolls 18 are positioned beyond the turn of the belt 15. The extreme left hand roll 19 over which the band 15 passes has the portion 25 of the stud 21 passing through a slot 27, as shown in Figure 2. This roll 19, being movable longitudinally of the channel 17, may serve as a means for tightening the belt or band 15. The rolls 18 which are positioned beyond the band, by means of the eccentric shank 22, may have their circumferences brought into alignment with the face of the belt 15. In case the band or belt 15 is not used, these rolls 18 may be aligned with the rolls 19.

At the right hand of Figures 1 and 2 is shown a rotary brush 110 mounted on a shaft 111 which carries on its end a pulley 112. This shaft 111 is carried in bearings 114 suitably fastened to the frame work 9 of the machine so as to position the brush 110 below the plane of movement of the panel 5 and with the bristles of the brush in contact with the lower surface of said panel 5. By means of the belt 115 and motor 116 this brush 110 is given a rapid rotary motion to clean and remove from the under surface of the panel any dirt or particles of plaster or of fiber from the paper facing of the plaster board. This cleaning operation is effected in order that the surface may be ready for printing as soon as the panel is moved forward to the printing device.

At 120 in Figure 1 is shown a box-like member positioned below the roller 102. Extending through the side of the box 120 is a shaft 122 having fastened thereto a flange pulley 124 which is driven by the belt 126 passing over pulley 127 fastened on the shaft 42. Thus the shaft 122 is driven in a predetermined relation to the driving mechanism of the fabricating portion of the plaster board machine and also, in view of the connections, through the belts 40, 30 and 10 is driven in a substantially constant relation to the means for moving the panels of the plaster board or wall board forward longitudinally thereof. As hereafter will be described, motion of the shaft 122 produces a predetermined motion of the printing device so as to impress upon the sheet a mark or a series of marks, such as a line of dots. In view of this predetermined relation of the printing device to said shaft 122, which will be more fully described hereafter, and in view of the predetermined relation of the motion of the shaft 122 to the means for moving the panel toward the printing device, as described above, these marks are marked upon the panel substantially in a predetermined relation to each other and to the lengthwise dimension of the panel.

The shaft 122, as shown in Figure 9, extends through holes in the walls 130 of the box 120 and is journaled in bearings 132 supported by the bottom plate 133 extended beyond the walls 130 of said box. The box 120 may be mounted upon angle irons 134 for reinforcing the plate 133. These angles 134 are joined by plates 136 to angle irons 137, the parts 134, 136 and 137 forming stiff members beneath the box to transfer the weight thereof to angle iron members 140, which extend longitudinally of the apparatus. The angle members 140 are pivoted upon the shaft or rod 142, as shown in Figures 1, 10 and 11, said rod 142 being suitably supported by and fastened to members 9 of the frame of the apparatus. Also as shown in Figures 9 and 10 a rod 144 passes across between the spaced angle members 140 and through slots 146 cut longitudinally in said angles, said rod 144 being held against sliding endwise of itself by suitable washers and cotter pins. Said rod 144, however, is slidable in said slots 146 longitudinally of the angle members 140. As shown in Figure 10, by means of standards 148, which may be supported by the framework 9 or by other suitable means, the rod 144 may be caused to bear in a notch 149 in each of the standards 148. The standard 148 also is cut with a step 150 in such relation to the length of the slot 146 that when the rod 144 is moved to the left hand end of the slot 146, as shown in Figure 10, the rod 144, together with the angles 140 and the structure supported thereby, may move downwardly until the rod 144 rests upon the step 150. When the rod 144 is resting in the notches of the standards 148 the angle members 140, held at their other ends by the shaft 142, provide a substantially rigid support for the box 120 of the printing device. By means, hereafter to be described, when the box is in such position and with suitable adjustments of the parts of the printing device, contact of the printing surface of the device with the under side of the plaster board or wall board panel may be made. When the rod 144 is moved to the left end of the slot 146, with a slight lifting of the printing device by upward movement of the rod 144 to release it from the notch 149, the printing device may be lowered out of contact with the under side of the wall board by allowing the rod 146 to rest upon the step 150, the angle irons 140 pivoting upon the shaft 142 to a slightly inclined position. In view of the relatively short distance that the step 150 is below the notch 149 very slight movement is given to the printing device but the movement is sufficient to remove it from printing or marking contact. This slight movement in no material way affects the distance between the pulleys 124 and 127 so that the belt 126 remains on said pulleys and the printing device may be moved into or out of the operative position at will.

Upon the shaft 122 are mounted in the particular embodiment being described three ink rolls 155 which are constructed in the manner to be described hereafter, but which are fastened to the shaft 122 by means, such as set screws. These ink rolls 155 are positioned in general alignment and below that point on the face of the board at which it is desired to print the mark or line of marks. These ink rolls 155, therefore, are positioned in general relation to the face of the guide belt 15, or of the line tangential to the rolls 19 against which the edge 6 of the panel 5 bears during its forward motion into printing position, determined by the desired relation of the marks to said edge 6 of the panel 5. The space between the ink rolls lengthwise of the shaft 122 substantially is determined by the desired spacing of the lines or of the rows of marks or dots upon the panel. In the manufacture of wall boards and of plaster boards, particularly panels of such materials which are intended to be fastened to wood studding, of which the standard spacing is 16" centers, these ink rolls 155 may be positioned upon the shaft 122 spaced upon centers of approximately 8". The printing surfaces, of which the relation to the ink rolls will be described hereafter, may be set with suitable exactness on the 8" centers so that a panel which has 48" width may be marked by the outside printing or marking devices at 16" from the edges of the panels and at points 16" apart but symmetrically with the center line of the panel. In order, however, to take care of stud spaces which sometimes are 24" the center inking roll 155 (and its auxiliary devices) is positioned midway between the outer ink rolls and at a point offset from the face of the belt 15 substantially equal to 24". Thus the outer ink rolls 155 become positioned substantially 16" and 32" from the line of the face of said belt.

The above described arrangements are those which are commonly used for standard wall panels but, as will be clear from the drawings, the ink rolls may be shifted into different spacings along the shaft 122. As will also be clear from the description of the drawings to follow, the other devices utilized for carrying the ink to the marking device also may be set in different positions. These variations may be effected to some degree without substantial alteration of the box of the printing device and the parts thereof but in some cases it may be necessary to utilize a different plate 133 for the bottom of the box, and for the top plate 228 in order that the ink rolls 155 and the other parts of the printing mechanism may be set at different spaces.

Bearing upon the circumferential surface of the ink roll 155 and suitably mounted by means hereafter to be described, is the squeeze roll 157, as shown in Figures 9, 10 and 11, the purpose of which is to control the thickness of the film of ink which is to be transferred to the printing or marking element. The ink roll 155 dips into the ink in a pan 158 suspended below the ink roll 155 by tracks or brackets 159 fastened as by welding or other suitable means to the plate 133 of the box 120, the pans 158, being provided with flanges 160 bearing upon the tracks 159. By means of a handle 161 the ink pans 158 may be withdrawn longitudinally thereof. As the tracks or brackets 159, as well as the flanges 160, are of limited length the pan 158 may be withdrawn longitudinally thereof a relatively short distance and then may be dropped downwardly so as to remove the pan 158 from the box 120. The tracks 159, as may be seen from Figure 11, are relatively short, while the flanges 160 are of greater length so that the pan 158 may be withdrawn, for example, about 3" while the flanges still have bearing upon the tracks or brackets 159. The ends 165 of the flanges 160, which are at the end of the pan 158 opposite to the handle 161 are turned down so as to form a stop to prevent withdrawal of the pan 158 to such a degree that the inner end thereof will drop from its bearing upon the bracket 159. The stop 165, however, is so formed that the pan may be lifted slightly so that the stop 165 may pass over the bracket 159, thus making it possible to remove the pan 158 from the device. Normally, however, the pan need only be withdrawn to the extent limited by the stop 165 for the purpose of adding ink thereto. It will be understood from this description that the pan thus may be cleaned or refilled and reinserted without demounting or otherwise interfering with the printing device itself.

The ink roll 155 carries the ink upwardly, by rotation in the direction of the arrow, into contact with the squeeze roll 157 capable of circumferential movement in the same direction as that of the ink roll 155 and driven by contact with the circumference of said ink roll. The squeeze roll 157 is carried upon a stud 162 having a head 163 and a threaded shank 164. The shank 164 passes through a hole in the outer end of the arm 166. Nut 167 draws the stud 162 so that the shoulder thereof bears against the arm 166. The parts are so designed and finished that the squeeze roll 157 is free to turn upon the stud 162. Said squeeze roll is provided with a bushing 168, preferably of graphite or similar self lubricating bearing material, which provides lubrication for the bearing surface between said bushing and said stud.

The arm 166 is of bent form, as shown in Figure 10, and is provided with a hub 170, which is bored to turn freely upon a shaft 172 which extends through the walls 130 of the box 120 and is provided with collars 173, which are pinned to said shaft 172 to prevent endwise motion thereof. Upon this shaft 172 also is mounted a squeeze roll adjustment member 174 having an arm 176 and an oppositely extending arm 178. The arm 176 has its outer portion 177 formed with respect to the main portion of the arm so that it becomes positioned below a lug 169 which may be cast or otherwise fastened upon the side of the arm 166. Through the lug 169 is a hole 171, the portion 177 of the arm 176 also having a hole 179 therethrough.

As may be seen in Figures 9, 10 and 11 a spring 180 is hooked into the holes 171 and 179 and connects the lug 169 with the portion 177 of the arm 176. This spring, in the particular construction being described, is a tension spring and tends to rotate the arm 166, carrying the squeeze roll 157, toward the arm 176. The arm 178 of the squeeze roll adjustment member 174 bears against an adjustment screw 182 threaded into the angle 183 of the box 120, which screw is provided with a lock nut 184 for setting the screw 182 in the desired adjusted position. It will be apparent from a consideration of Figures 10 and 11 that as the screw 182 is turned so that its point travels inwardly of the box the arm 178 will be positioned toward the left and the portion 177 of the arm 176 will be moved to pull on the spring 180 to draw the arm 166 downwardly, thus to move the squeeze roll 157 against the ink roll 155. By suitably adjusting the set of the screw 182 greater or less contact pressure may be given between the squeeze roll 157 and the ink roll 155. By this means the thickness of the film carried up by the ink roll 155 may be controlled, the excess ink running back to the pan 158.

In order to transfer the film of ink which is carried by the ink roll 155 after contacting with the squeeze roll 157 I provide the transfer roll 190, said roll being carried upon a stud 192 having a threaded shank 194 passing through a hole in the bar 196 and secured thereto by means of the nut 198, as shown in Figures 9 and 11. The body 191 of the transfer roll 190 is provided with bushing 294 fitted thereto and providing a running fit on a stud 192. Said bushing may be of self-lubricating material such as graphite bearing material to provide lubrication for these surfaces, as does the graphite bushing 168 of the squeeze roll 157.

The opposite end of the bar 196 is pivotally connected to a transfer roll adjustment member 200, which member 200 is carried by the shaft 172 and is free to turn thereon. The member 200 has an arm 201 and an oppositely extending arm 202, the bar 196 being connected to the arm 201 by means of a stud 204 passing through a hole in the bossed portion 203 of said arm 201. Said stud 204 is provided with a shoulder portion 207 and a flange head 208. The shoulder 207 of said stud 204 may be drawn against the boss 203 of the arm 201 by means of the nut 206, sufficient clearance being provided, however, between the head 208 and said boss 203 of the arm 201 to permit said bar 196 freely to pivot therebetween upon stud 204.

As will be seen in Figures 11 and 10 I provide screws 210 and 211 each passing through an angle of the box 120 and arranged so that respectively the arms 201 and 202 contact therewith. The screws 210 and 211 may be screwed inwardly and outwardly of the box respectively in order to move the transfer adjustment member 200 in a counter clockwise direction, as viewed in Figure 10. By contrary motion of the screws, the opposite motion of said transfer member may be effected. Such angular or rotary motion of the member 200 produces in the member 196 a motion of general translation lengthwise of said member 196. As said member 196 carries the transfer roll 190 it will be apparent that said roll 190 correspondingly is moved to the left or right of Figure 10. As the bar 196 is pivoted at its point of connection to the arm 201, the transfer roll 190 is free to rest upon the ink roll 155 and does so rest by its weight. Thus it will be clear that as movement of translation is given to the bar 196 the transfer roll 190 will move in an arc about the center of the shaft 122, that is, always in circumferential contact with the ink roll 155.

As will be clear from the description to follow of the printing member, greater or less contact of said printing member with said transfer roll 190 may be produced depending upon the position of said roll 190 as determined by the set of said screws 210 and 211. When the desired set of the transfer roll is secured, by means of nuts 212 and 213, these set screws may be fastened in position bearing solidly against both arms 201 and 202 to hold the bar 196 and the transfer roll in the desired position.

As shown in Figures 9, 10 and 11, upon a shaft 220 journaled in bearings 222, which are fastened upon angles 224, are mounted printing wheels 226, said wheels 226 being secured to the shaft 220 by set screws 227. The angle plates 224 are suitably fastened as by welding to the side walls 130 of the box 120 and in such position that the shaft 220 passes above a top plate 228 of said box 120. Said plate 228 is provided with openings 229 therein through which the printing wheels 226 may rotate in order to contact the transfer roll 190 and to receive therefrom the ink which has been transferred from the ink roll 155. As the bearings 228 are fixed in relation to the box the printing wheels 226 revolve in a fixed relation to the box and to the frame of the machine, in view of the support of said box 120, as described above.

Figures 12, 13:
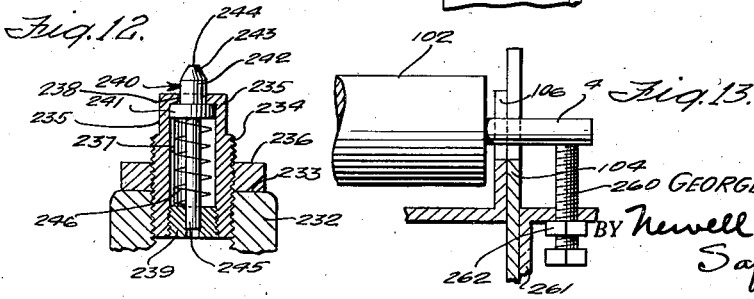
Figure 12 shows in section a detail of the printing device.
Figure 13 shows a detail of a portion of the apparatus.

The printing wheel 226 is formed with a hub 230 from which project, in the particular form illustrated in the drawings, bosses 232. Said bosses are formed with their axes radially of the shaft 220 and are threaded to receive ink point adjustment bushings 234. The bosses 232 are substantially of the same radial length and provide surfaces 233 normal to the axes of said bosses 232 against which surfaces lock nuts 236 bear to lock the ink point bushings 234 in position and rigidly to hold said bushings in relation to the hubs 226. For the purpose of making this adjustment the outer end of the ink point bushings 234 is provided with flats 235, as shown in Figure 12, so that the bushing may be held by a wrench against turning while the lock nut 236 is tightened against the face of the boss 232. Moreover, by turning the bushing 234 in the threads of the boss 232 the bushing may be screwed inwardly or outwardly of said boss, that is, inwardly toward the axis of the shaft 220, or outwardly therefrom. A fine adjustment of the position of the bushing may, therefore, be secured.

The bushing 234, as may be seen in Figure 12, is hollow and may be provided with a smooth bore in which the printing point 240 may move with the flange or collar 241 thereof sliding on the bored surface 237 of the bushing 234. The outer end of the bushing 234 is provided with a hole 238 somewhat smaller than the bore 237 of the bushing in order that the flange or collar 241 may bear thereagainst to limit the outward movement of the printing point 240. Through the hole 238 extends a shank 242 of the printing point 240 of such diameter as freely to clear the walls of the hole 238. The shank 242 of the printing point is provided with a tapered portion 243 having a flattened surface 244 of a predetermined diameter or area. This surface 244, moreover, may be of predetermined shape. In one embodiment of the invention, the shank 242 is made cylindrical and the portion 243 is turned conical, thus forming the surface 244 as a circle. By selecting a suitable form for the shank 242 or otherwise forming the pointed portion 243 of the printing point, different forms of the end surface 244 may be secured. The end surface 244 preferably is normal to the axis of the printing point 240 and of the bushing 234 and provides the surface to carry the ink and to contact with the surface of the panel to be printed. Within the scope of the invention, however, this surface may be of any desired outline and convolution and placed in any operative relation to the shaft 220.

At the inner end of the bushing 234 the bore thereof is threaded to receive a bushing screw 239 which is drilled to receive in sliding relation to said bushing screw 239 the spindle 245 of the printing point 240. It will be clear from Figure 12 that the printing point 240 may move within the bushing 234 in the direction of the axis of said bushing 234, that is, radially of the shaft 220. By means of a compression spring 246 bearing against the flange or collar 241 and also against the bushing screw 239 the printing point 240 is biased to move outwardly in a radial direction from said shaft 220, the outward movement of said printing point 240 being limited as above stated by the flange 241 bearing against the end of the bore 237 of the bushing 234. The printing point 240, however, when pressure is applied inwardly upon the shank 242 or upon the surface 244 thereof, may be moved inwardly against the bias of the spring 246. Thus, as the printing points are rotated upon rotation of the shaft 220 they may be brought into contact with the under side of the panels 5 and may press thereagainst with a slight movement of the printing point 240 inwardly toward the axis of the shaft 220. The spring thus measures the degree of pressure of each printing point as it contacts with the face of the panel 5. This movement may be very slight and only that required to release the flange 241 from its bearing against the end of the bore 237. In some cases, however, as when it is desired to indent the surface of the panel or sheet, with or without concomitant printing thereof, greater movement may be utilized; also greater or less pressure may be secured by proper selection of the spring as to its strength and resistance under compression. After the surface 244 of the printing point 240 has moved out of contact with the face of the panel 5 said printing point moves outwardly again until flange 241 bears against the outer end of the bushing.

As the printing points 240, of which four are shown in the illustrated embodiment of the invention, are spaced about the axis of the shaft 220 they are moved successively into contact with the face of the panel 5. Thus, upon the under face of the panel 5 may be printed a series of marks or dots lengthwise of the motion of the panel past the printing device. Uniform spacing of these dots will be secured if uniform motion is given to the panel 5, the printing points 240, as shown in Figure 10, being spaced uniformly about the shaft 220, and if also said shaft 220 is given a substantially uniform motion in relation to the movement of the panel 5. As has been described above, substantial uniform motion of the panel 5 may be secured by the positive drive of the rollers 7 and 8.

In order to secure a positive drive of the shaft 220, upon one end thereof is mounted a chain gear 250 connecting by chain 251 from a chain gear 252 upon the shaft 122. As has been stated above, the shaft 122 is positively connected to the driving apparatus of the fabricating end of the plaster board machine and thus a positive turning movement, and at a substantially uniform speed, may be secured for the shaft 220.

While in most cases, in the application of the invention to the marking of plaster boards and wall boards, a uniform spacing of the marks in alignment is preferable, in some cases it may be desired to secure predetermined spacings which are not equal. In such case, by interposing a variable speed device or a device effecting a dwell between the motion of the shaft 122 and the shaft 220 or by replacing the drive belt 126 by apparatus for varying the speed or causing dwell, a non-uniform spacing of the dots in a predetermined relation to each other may be secured with constant and uniform delivery of the panel in relation to the printing device as a whole.

It will be clear to those skilled in the art that by adjusting the bushings 234 in the bosses 232, for example by the use of suitable gauges, the surfaces 244 of the printing points 240 may all be gauged to a substantially constant distance from the axis of the shaft 220. Thus all of said surfaces 244 may bear with substantially uniform pressure upon the face of the panel 5. In order properly to apply the ink upon said surfaces 244 the transfer roll 190 may be adjusted by means of the screws 210 and 211, as above described, to roll upon the ink roller 155 until the surface of the transfer roll touches the surfaces 244 as the printing wheel 226 is revolved. By moving the screw 210 inwardly and backing off the screw 211 the transfer roll may be moved away from the surfaces 244 of the printing points 240 and on the other hand, by backing off the screw 210 and screwing the screw 211 further toward the left, the transfer roll 190 may be moved into closer contact with the surfaces 244 of the printing points, said roll 190 being moved by the bar 196 as it is moved by the rotation of the member 200 upon the shaft 172. A fine adjustment of the parts thus may be secured so that a fine control of the amount of ink applied to the printing point surfaces 244 is thus obtained. This feature of the invention insures, for example, that the amount of ink applied to the face of the panel is adequate for making a mark which is discernible but avoids the application of ink in excess so that, in consideration of the diameter or surface area of the surface 244 of the printing points 240, said marks may be inconspicuous upon the panel. This is of advantage in securing a surface of the panel which is inconspicuously marked in the desired relation to its edges and therefore which may be used without being covered by covering materials or by several coats of paint.

In Figure 10 is shown the roll 102 referred to above in the description in connection with Figure 1, which roll is mounted so as to be above the point of contact of the printing points 240 with the under face of the panel 5. As shown in Figures 9 and 10 the belts 10 pass over the rollers 8, the shank 242 of the printing points extending up between adjacent belts 10. The panel 5 is carried upon said belts 10, as described above and passes under the roller 102 which need bear thereon only sufficiently to prevent upward movement of the panel 5. In order to secure the proper adjustment of circumferential contact of the roll 102 with the upper face of the panel 5 as it moves on the belts 10, as shown in Figure 13 screw 260 is threaded in angle 261 which may be part of the supporting frame and bears against the shaft or rod 4 of the roller 102. As said shaft 4 is inserted in the slot 106, as described above in connection with the rollers 7 and 8, the screw 260 may be set so that the point thereof may bear on the under side of the shaft or rod 4. By turning the screws 260 at each end of the shaft or rod 4, said shaft may be moved upward or downward in order to adjust the position of the roll 102 in relation to the faces 244 of the printing points. By means of a nut 262 the screw 260 may be held in the set position. In many cases, however, particularly with plaster boards which are of sufficient weight in themselves to rest upon the belts 10 and to be carried forward therewith while supported by the rollers 8 without substantial slip or displacement in relation to said belts 10, the roller 102 may be lifted out of contact with the panel 5.

As shown in Figure 9 the ink roll 155 is constructed with a hub 270 having a disc 271, cast or formed integral therewith or otherwise secured to said hub 270, provided with an annular portion 272 which is turned upon its outer face 273 concentric with the shaft 122. Said annular portion 272 is provided with bosses 274 drilled to receive bolts 275, which, with nuts 276, serve to hold annular member 278 upon the annular portion 272 of the ink roll 155. Said annular member 278 has the inner surface 279 turned to fit the outer surface 273 of the annular portion 272 of the ink roll 155. Clearance is provided between the part 280 of the annular member 278 and the annular portion 272 of the disc 271 so that said annular member 278 may move upon the annular portion 272 of the ink roll 155, thus to clamp between the face 277 of the disc 271 and the face 281 of the annular member 278, a ring 283.

Said ring is formed to fit upon the surface 273 of the annular portion 272 and is of such outside diameter that the outer circumference thereof extends somewhat beyond the outer circumferences of the disc 271 and of the annular member 278. Thus, the ring 283 may be securely held in place and its circumference positioned concentric with the axis of the shaft 122, the hub 270 being provided with a set screw 284 to secure the ink roll to the shaft 122. By means of the ring 283 a hard, smooth surface is thus secured against which the squeeze roll 157 may act to determine the thickness of the film of ink which is to be delivered to the transfer roll 190. Said ring 283 may be made of steel and the disc 271 and the annular member 278 may be made of cast iron. Other materials, however, may be utilized in the construction of this ring and of these parts in order to secure a hard smooth, preferably non-resilient, circumferential surface of the ring 283 and to hold said ring in rigid concentric relation to the shaft 122.

The squeeze roll 157 may be made of cast iron or other material, preferably non-resilient, and capable of being turned or formed with a relatively hard, smooth surface. This roll, being relatively small and of simple construction, may readily be replaced when worn. The ring 283, as will be seen from the construction described and shown in Figure 9, may be removed and reground or replaced when worn or if it becomes pitted due to contact with the ink. Replacement of the remainder of the assembly thus may be avoided and the relationship of the parts to the shaft 122 may be maintained. In general the materials used for the ring 283 and the squeeze roll 157 are such as to provide hard, smooth contact surfaces so that the film of ink may be more accurately controlled by the setting of the parts as described.

As shown also in Figure 9 the transfer roll 190 has attached to or integral with the body portion 191 a flange portion 193. The body portion 191 is turned upon its outer circumference 195 to be concentric with the axis of the stud 192. A clamping member of annular form 197 has an inner surface 199 turned to fit the surface 195. The portion of the member 197 nearer the axis is formed to provide clearance between itself and the body 191 of the transfer roll 190 and is held thereto by bolts 290 and nuts 291. Between the flange 193 and the member of annular form 197 is clamped by means of said bolts 290 a ring 293, preferably of such composition, for example rubber, as to provide a slight resiliency especially at the circumferential surface thereof for contact with the surface 244 of the printing point 240 upon the printing wheel 226. As will be understood from the above description, the member of annular form 197 is removable from the body 191 of the transfer roll. This ring 293 thus readily may be replaced when the surface thereof becomes damaged or deteriorates with use. Thus the circumferential surface of this ring may be maintained concentric with the axis of the stud 192 and the fine adjustment and setting of the contact of the transfer roll 190 with the printing points, as above described, may be maintained.

As stated above, preferably I utilize for the ring 293 a relatively resilient material so that a gentle contact of the printing points 242 against the surface of said ring 293 may be secured. If the adjusted position of the roll 190 in relation to the printing wheel 226 or the setting of the different printing points 242 should be not exactly and accurately made, the slightly resilient surface of the ring 293 permits the points 242 to indent slightly the ring 293 without harmful wear or damaging effect upon said points 242 or upon said ring 293. Moreover, as the transfer roll 190 is driven only by friction contact with the ink roll 155 any slippage, which may produce a difference in the circumferential motion of the transfer roll 190 with respect to the circumferential movement of the printing points 242, may occur without serious wear producing friction as this action will be substantially lessened with the resilient material. Thus wear, tending to cause deformation of the surface 244 of the printing points 242, is avoided or minimized.

In the particular embodiment of the invention described and illustrated in the drawings a resilient material such as rubber is used for the ring 293, which material also has been selected because of its capacity for providing upon the circumferential surface of the ring 293 a surface having the desired capillary action with respect to the ink in order to effect transfer of the ink from the ink roll 155 to itself and from itself to the surface 244 of the printing points 242. In some cases, however, I may utilize other materials for said ring 293 which will provide this capillary effect. For example, I may use metals or other hard or semihard materials leaving the surface thereof so turned or ground or grooved or otherwise finished as to provide the capillary action which will cause the ink to be picked up by said surface from the ink roll 155. The finish of said surface also may be such that the surfaces 244 of the printing points 242 will pick up the ink therefrom. In some cases said surface 244, being formed on metallic or other hard materials, may be produced by machining or grinding or grooving.

In order to secure the parts in their proper operating relations, upon the shaft 172 are pinned collars 300 to prevent endwise motion of the members 200, 166 and 174 while permitting rotation of said members upon the shaft 172. As stated above the ink rolls 155 may be reset in different positions along the shaft 122 in order to position the printing points in different relations to the guide 15 so as to effect printing of the marks in different positions upon the panel 5 in relation to the lateral edge thereof. Similarly the members 166, 174 and 200 together with the squeeze rolls 157 and the transfer rolls 190 and the auxiliary parts associated therewith, may be reset in different positions along the shaft 172, the pins 301 being set in different holes in the shaft 172 or other means being adapted to hold said members and parts in proper relation to the ink rolls 155 and to each other. In some cases, as suggested above, it may be necessary to modify or replace top plate 228 and the bottom plate 133 and also to relocate the ink pans 158 and the parts associated therewith. The printing wheels 226 correspondingly may be reset on the shaft 220.

In Figure 9 may be seen the splash pan or shield 310 having a sloping end 311. This pan is of such form as to surround the ink roll 155 and to extend up to the lower part of the squeeze roll 157 and of the transfer roll 190. This pan or shield intercepts any ink thrown out by the ink roll 155 as it revolves and any drip of ink from the three rolls and returns it to the ink pan 158. Thus the mechanism is maintained clean and the ink is confined to the parts which are intended to carry it upward in controlled amount to the surface to be printed. It will be clear from the above description that the movement of the ink toward said surface is against the action of gravity and a drip and splash are caused to move away from said surface and the parts which immediately contact therewith. In dotted outline in Figures 9, 10 and 11 is shown a cover 313 which may be removed when the printing apparatus is to be used and when in place will protect the printing mechanism from dirt and damage.

While in the above explanation the squeeze rolls 157 and the transfer rolls 190 are described as turning by friction upon the ink roll 155, these rolls may be driven by suitable gearing or other power transmitting device, for example, from the shaft 122. As an example of one such drive a chain may pass over a gear fastened upon the shaft 122 and over a gear fastened to the transfer roll 190. As the transfer roll 190 may be moved in a circle about the axis of the shaft 122 a constant center line distance may be obtained between such gears. Similar drive may be arranged for the squeeze roll 157. Such modifications may be made within the scope of the invention.

While the invention has been described above in its embodiment in an apparatus for printing wall board or plaster board, the apparatus embodying the features described or with modifications which will be evident to those skilled in the art, may be utilized in printing other sheet materials without departing from the spirit of the invention. Moreover, while certain of the details of construction above described constitute features of the invention, within the scope of the invention other detailed constructions may be utilized in order to carry out the method of the invention and the operations of feeding the panel or the sheet in predetermined alignment with the printing device and of securing a predetermined motion of the printing device in relation to the sheet so as to secure the desired alignment of the mark or of a series of marks or dots in relation both to the lateral edge of the sheet and in spaced relation lengthwise of the sheet. The details of mechanical construction also may be modified as to the type of materials utilized or the particular arrangement of the parts while maintaining the features of the invention which provide for easy replacement of the wearing parts, the action and relation of the parts and their means of adjustment. All such modifications are within the scope of the invention and are intended to be covered by the claims.

Having thus described my invention I claim:

1. Apparatus for marking a sheet of predetermined surface dimensions comprising means for effecting movement of said sheet laterally of and also generally in the direction of a selected surface dimension of the sheet, means for limiting said lateral motion of the sheet while permitting motion in said selected direction, and means for making a mark upon the face of said sheet while said sheet is moving in said selected direction, said means for limiting said lateral motion being so constructed and arranged in relation to said marking means as to act substantially throughout said motion of the sheet in said selected direction to determine the position of said sheet in relation to said marking means.

2. Apparatus for marking a sheet having a substantially rectilinear edge comprising means for simultaneously moving said sheet in the general direction of said edge and also laterally thereof, said means being positively actuated and substantially controlling the rate of movement in the direction of said edge and positively biasing said sheet to move laterally of said edge, means so positioned and constructed that said edge of the sheet may bear thereagainst and to limit the movement of said sheet under said bias, and means for marking the surface of said sheet actuated in positive relation to said positively actuated moving means, said means for limiting the bias movement being so constructed and arranged in relation to said marking means as to determine the position of said sheet in relation to said marking means substantially throughout the marking action of said marking means, whereby said mark is made upon the sheet in a predetermined relation to said edge.

3. Apparatus for marking a sheet having a substantially rectilinear edge comprising means for simultaneously moving said sheet in the general direction of said edge and also laterally thereof, said means being positively actuated and substantially controlling the rate of movement in the direction of said edge and positively biasing said sheet to move laterally of said edge, means so positioned and constructed that said edge of the sheet may bear thereagainst to limit the movement of said sheet under said bias, and means for marking the surface of said sheet actuated in positive relation to said positively actuated moving means, said marking means being so positioned with respect to said means for limiting the bias movement that said mark is made upon the sheet in a predetermined relation to said edge, said means for limiting the bias movement of the sheet being so constructed as to move with and under the impelling action of the positively moved sheet in said general direction of said edge of the sheet.

4. In combination with a machine for successively cutting off panels from a continuously delivered sheet of panel material, said delivery being subject to lateral variation, means for positively moving each panel in the general direction of one of its edges after being cut off from the sheet, said means being so constructed and arranged as also positively to bias said panel to move in the direction laterally outwardly of the panel from said edge, guide means positioned in the path of said lateral motion and so constructed that said edge bearing thereagainst is in a position laterally displaced in excess of said variation laterally of said delivery, said guide means being constructed with a part movable in the direction of said edge of the panel and capable of being so moved by the panel when the edge thereof is in contact with said part, and means for making a mark upon the surface of said panel, said marking means being so constructed and arranged with respect to said guide means that said mark is made upon the panel in a predetermined relation to said edge thereof, said marking means being actuated in a positive relation to said means for moving the panel in the direction of said edge thereof so as repeatedly to contact said panel to produce thereon a series of marks in predetermined spaced relation in said general direction of said edge.

5. Apparatus for feeding a sheet of material having a substantially rectilinear edge comprising means including a roller for contacting the face of said sheet in substantially positive driving contact, said roller being arranged generally transversely of said edge of the sheet but skewed in relation to motion thereof parallel to said edge, whereby upon rotation of the roller said sheet is caused to move generally parallel to said edge but also to be biased to move laterally of said edge, guide means positioned to receive the contact of said edge upon a movement of the sheet into a predetermined laterally displaced position, said guide means comprising a part movable in the direction generally parallel to said edge and providing a bias resisting contact surface for said edge of the sheet to maintain alignment of the motion thereof parallel to said edge, said movable part of said guide means being constructed and arranged to be moved by said moving sheet contacting therewith, and means for positively driving said roller to move the sheet.

6. Apparatus for feeding a sheet having an edge of predetermined linear form comprising means for moving said sheet generally in the direction like-extending with said edge, and means for guiding said sheet to move in said direction, said guiding means including a plurality of rolls arranged to provide an effectively continuous bearing for said edge of the sheet and having the peripheries thereof tangent in common to a line parallel to the desired line of motion of the sheet, said rolls being so mounted as to be capable of rotating on their axes so that the peripheries move tangentially to said common line.

7. Apparatus as described in claim 6 in which the rolls are mounted on bearings, said bearings being constructed to turn upon an axis to which the axis of the roll is eccentric.

8. Apparatus for feeding a sheet having an edge of predetermined linear form comprising means for moving said sheet generally in the direction like-extending with said edge, and means for guiding said sheet to move in said direction, said guiding means including a plurality of rolls and a band moving in circumferential contact therewith, said rolls being sufficient in number and being arranged so as to provide an effectively continuous support for said band to receive the bearing of said edge of the sheet against said band and to guide said band to move in a line parallel to the desired line of motion of the sheet as said edge bears thereagainst.

9. Apparatus for marking a sheet having an edge of predetermined linear form comprising a marking device, means for moving said sheet toward said marking device generally in the direction of said edge, said moving means simultaneously acting to bias said sheet to move laterally of said edge, and guiding means in the path of said lateral motion of the sheet, said guiding means being positioned to receive the bearing of said edge of the sheet upon movement thereof into a predetermined lateral position to limit the further lateral movement of the sheet, said guiding means comprising an endless band passing in peripheral contact with a plurality of rolls mounted to turn upon axes transverse to the plane of lateral motion of the sheet, whereby the face of the band forms a continuous surface transversely of said plane of lateral motion of the sheet, the mounting of said rolls being so constructed that the rolls may be moved in a direction generally parallel to the plane of said lateral motion of the sheet, said rolls being sufficient in number to bring the face of the band into contact with said edge of predetermined linear form of the sheet substantially throughout the length of said edge in said predetermined lateral position, said rolls being mounted to turn on their axes and to carry the band in a predetermined line of motion when contact of said edge of the moving sheet with said band is made, whereby said sheet is given a predetermined motion with respect to said marking device.

10. Apparatus for producing wall board comprising means for feeding panels of the wall board in the general direction of one of the edges of the panel, a plurality of rollers turning upon horizontal axes generally transversely of said direction of feeding the panels and arranged with the circumferences thereof substantially tangential to a horizontal plane to take the bearing of a face of the panels, said rollers having their axes skewed in the horizontal plane so as to cause said panels also to move laterally of said feeding motion, a continuous band mounted to move in peripheral contact with a plurality of rolls, said rolls being arranged to turn upon vertical axes and being so set and being in such number that said band is supported thereby throughout a substantial portion of its length in a straight line parallel to a predetermined line of motion generally like-extending with the direction of said feed motion, said band and said rolls being so mounted with respect to the plane of the panel that by said lateral movement thereof said edge of the panel is moved to bear against the face of said band throughout a substantial portion of the length of said edge, and a positively driven belt arranged in driving contact with said skewed rollers.

11. Apparatus for marking a sheet comprising means for positively feeding the sheet in the direction of one of its surface dimensions, means rotating upon an axis parallel to a face of the sheet and providing a marking element for contacting the face of the moving sheet in each rotation of said rotating means, and means for effecting rotation of said rotating means in a predetermined relation to the movement of said feeding means to cause said marking element repeatedly to contact the sheet to make thereon a plurality of marks in predetermined spaced relation in the direction of said dimension of the sheet.

12. In a printing device a printing element, and means for yieldingly supporting said printing element to move in a predetermined path, said supporting means being constructed for adjustment of the position of said element with respect to the surface to be printed without modifying the relation of the parts providing the yielding action.

13. In a printing device, a printing element, means for supporting said printing element in printing relation to a surface to be printed, means providing for yield of said printing element upon contact thereof with said surface, and means for guiding said printing element in its yielding movement, said guiding means being adjustable with respect to said supporting means to predetermine the relation of said element to said surface.

14. In a printing device, a rotating member, a printing element mounted adjacent the periphery of said rotating member, said rotating member being so positioned in relation to the surface to be printed that said printing element may contact said surface upon rotation of said rotating member, means providing for yielding movement of said printing element in a predetermined relation to said rotating member upon contact of said printing element with the surface to be printed, and means for adjusting the contact relation of said element to said surface to be printed without modifying the relation of the parts providing the yielding movement.

15. In a printing device, a rotating member, a printing element mounted adjacent the periphery of said rotating member, said rotating member being so positioned in relation to the surface to be printed that said printing element may contact said surface upon rotation of said rotating member, means providing for yielding movement of said printing element in a predetermined relation to said rotating member upon contact of said printing element with the surface to be printed, means for restoring said printing element to its initial position upon rotation thereof out of contact with the surface to be printed, and means for determining the contact relation of said element independently of the operation of said restoring means.

16. In a printing device, a member mounted to rotate upon an axis, a printing element, said printing element being movable in relation to said member outwardly of and inwardly toward the axis of said member, means to bias said printing element to move relative to said member outwardly from said axis, means to limit the motion of said printing element under said bias, and means independent of said limiting means for predetermining the bias of said bias means, said rotating member being so mounted in relation to the surface to be printed that said printing element contacts said surface with pressure sufficient to move said printing element toward said axis against said bias.

17. In a printing device, a hub mounted to rotate upon an axis, a socket mounted on the periphery of said hub, a printing element slidable in said socket in the directions toward and outwardly of said axis and having a printing surface at the outer end thereof, a spring in said socket and acting upon said printing element to bias it to move outwardly from said axis, means for limiting the outward movement of said printing element in said socket, and means independent of said limiting means for adjusting the bias of said spring, said hub being so mounted in relation to the surface to be printed that said printing element may be moved against its bias while said outer surface thereof contacts with said surface to be printed and thereafter may be restored to its outwardly biased position.

18. In a printing device, an ink roller, a squeeze roll in circumferential rolling contact with said ink roller, and adjustable means for securing a predetermined pressure of contact between said roller and said roll.

19. In a printing device, an ink roller mounted to turn upon an axis, a squeeze roll, means movable in relation to said axis and carrying said squeeze roll, said means being so pivotally arranged that said roll may be moved into circumferential rolling contact with said ink roller, means to bias said pivotally arranged movable means to move said roll into contact with said roller and to press the circumferential surface of said roll upon the circumferential surface of said roller, and means for adjusting said pressure to a predetermined amount.

20. In a printing device, an ink roller mounted to turn on an axis, an arm mounted to pivot upon an axis fixed in relation to the axis of said roller, a squeeze roll mounted upon said arm at a point removed from the pivotal axis thereof, said arm and said roll being of such proportions and being positioned in such relation to said ink roller that the circumferential surface of said squeeze roll may contact with the circumferential surface of said ink roller upon pivotal movement of said arm, an adjustment member pivoted upon an axis generally like-extending with the axis of said arm, means connecting said arm with said adjustment member, and means for limiting pivotal motion of said adjustment member upon its axis to adjust the contact relation of said squeeze roll upon said ink roller.

21. A printing device according to claim 20 in which said connecting means includes means to bias said arm to move in relation to said adjustment member to cause contact of said squeeze roll with said ink roller, said means for limiting the pivotal motion of the adjustment means being adjustable to control the pressure of said squeeze roll upon said ink roller produced by said bias means.

22. In a printing device, an ink roller, means for applying a coating of ink upon the circumferential surface of said roller, a rotating printing member having a printing surface in peripheral relation to the axis of rotation thereof, an ink transfer roll, and means for so supporting said transfer roll that the surface thereof may make continuous ink transferring contact with the coated surface of said ink roller, said supporting means being so constructed and arranged as to position said transfer roll with its circumferential surface substantially tangent to the path of said printing surface as it rotates about the axis of said printing member and so as to bear in ink transferring contact against said printing surface while maintaining said continuous ink transferring contact with said ink roller.

23. A printing device as in claim 22 in which the means for supporting the ink transfer roll is so constructed and arranged as to provide for rolling said transfer roll into different tangential positions upon said ink roller to adjust the ink transferring contact thereof with said printing surface.

24. A printing device according to claim 22 comprising a member pivoted upon an axis, a link extending from said ink transfer roll to said pivoted member and connected thereto at a point removed from said pivoting axis, and means for setting said pivoted member in different positions angularly displaced about said pivoting axis to set said ink transfer roller in ink transferring contact with the printing surface of the printing member.

25. In a printing device, an ink roller, a rotating printing member having a printing surface circumferentially thereof, an ink transfer roll, an adjustment member pivoted upon an axis substantially parallel to the axis of rotation of said ink roller, a link pivotally connected to said adjustment member at a point removed from said pivoting axis of said member and so as to move upon said pivotal connection to said member in a plane generally transverse to said axes, said link at a point thereon removed from its pivotal connection to said adjustment member carrying said ink transfer roll upon an axis generally parallel to the axis of said ink roller and with the circumferential surface of said transfer roll in rolling contact with the circumferential surface of said ink roller, said printing member being positioned in the path of said transfer roll as it is moved into different positions of rolling contact with said ink roller, and means for adjusting the position of said adjustment member to position the transfer roll in said path so that its circumferential surface may bear upon the printing surface of said printing member in ink transferring contact.

26. A printing device according to claim 25 in which the adjustment member is provided with an arm, and comprising means for adjustably setting said arm in different positions about the axis of said adjustment member to set said transfer roll in said ink transferring contact.

27. In a printing device, a structure carrying a printing element, means for supporting said structure with said printing element in printing contact with the surface to be printed, and means for driving said printing element to cause printing contact with said surface, said supporting means including means to effect support of said structure with the printing element out of contact with said surface to be printed, said supporting means being so arranged with respect to said driving means as to maintain driving connection to said printing element in both positions of said structure.

28. In a printing device, a structure carrying a printing element, means for supporting said structure arranged to pivot upon an axis offset from said structure, means providing bearing support for said pivoted means at a point removed from said axis, whereby rotation thereof under the weight of said structure is prevented, said bearing support being constructed to provide bearing for said pivoted means to hold said structure with said printing element in contact with the surface to be printed and also to provide bearing for a member of said pivoted means arranged to contact therewith to hold said printing element out of contact with said surface to be printed.

29. Apparatus for marking a sheet comprising means for effecting movement of the sheet in the direction of one of its surface dimensions, means for making a mark upon the surface of the sheet while moving in said direction, said marking means including a rotating member, a printing element mounted adjacent the periphery of said rotating member, said rotating member being so positioned in relation to the surface of the sheet that said printing element contacts said surface of the moving sheet upon rotation of said printing member, means adjustable with respect to said rotating member and providing a guide for yielding movement of said printing element with respect to said rotating member upon contact of said printing element with said surface of the sheet, and means for positively rotating said rotating member in a predetermined relation to the movement of the sheet.

30. Apparatus for feeding sheet material comprising a plurality of rollers turning upon axes extending generally transversely of the direction of feeding the sheet and arranged with the circumferences thereof substantially tangential to said direction of feeding the sheet to take the bearing of the face of the sheet, a positively driven belt arranged successively to engage said rollers for positively turning said rollers on their axes, and idler pulleys intermediate some of said rollers adjustably arranged to engage said belt to hold said belt in engagement with adjacent rollers to modify the driving contact with said adjacent rollers.

31. Apparatus according to claim 30 in which said idler pulleys are arranged to be individually adjustable in relation to said rollers.

32. Apparatus according to claim 30 in which means are provided connecting a plurality of said idler pulleys and arranged for simultaneous adjustment thereof with respect to said rollers upon actuation of said means.

33. Apparatus according to claim 30 in which said belt is formed as an endless belt with a stretch thereof passing between said rollers and said pulleys, and means for adjusting the tension in said belt to modify in common the driving contact of said belt with said plurality of rollers and pulleys.

34. Apparatus for marking a sheet comprising means for feeding the sheet in the plane of its extent, means positioned beneath said plane of the sheet and providing a marking element arranged for marking contact with the lower face of said moving sheet, means beneath said sheet providing a supply of marking fluid out of contact with said marking element, means for transferring marking fluid to said marking element, and means for controlling and limiting the amount of marking fluid carried by said transfer means and transferred to said marking element.

35. Apparatus for marking a sheet having a lateral edge comprising means for positively effecting movement of said sheet laterally of and also in the direction generally like extending with said lateral edge, means for limiting said lateral motion of the sheet while permitting motion in said direction like extending with said lateral edge, and means for making a mark upon the face of the sheet while said sheet is moving in said direction like extending with said edge and is limited against motion laterally of said edge, said means for positively effecting movement of the sheet being arranged in relation to said marking means so as positively to determine motion of the sheet in said direction like extending with said edge during the marking action of said marking means upon said sheet.

36. In a printing device, an ink roller mounted to turn upon an axis, a squeeze roll, means movable in relation to said axis and carrying said squeeze roll, said means being so arranged that said roll may be moved into circumferential rolling contact with said ink roller, and means to bias said movable means to move said roll into contact with said roller.

37. In a printing device a printing element, means for supporting said printing element yieldingly to move against a resistance upon contact of said printing element with the surface to be printed, and means for adjusting the amount of resistance to said movement without changing the relation of said element to said surface for printing contact.

GEORGE HENRY CHARNOCK.